United States Patent
Huang et al.

(10) Patent No.: US 11,086,957 B2
(45) Date of Patent: Aug. 10, 2021

(54) SYSTEM AND METHOD FOR UNIFORM RESOURCE IDENTIFIER (URI) CONSOLIDATION

(71) Applicant: Beijing DiDi Infinity Technology and Development Co., Ltd., Beijing (CN)

(72) Inventors: Tao Huang, San Jose, CA (US); Zhiwei Qin, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 37 days.

(21) Appl. No.: 16/220,429

(22) Filed: Dec. 14, 2018

(65) Prior Publication Data

US 2019/0197076 A1 Jun. 27, 2019

Related U.S. Application Data

(60) Provisional application No. 62/610,371, filed on Dec. 26, 2017.

(51) Int. Cl.
*G06F 17/10* (2006.01)
*G06F 16/955* (2019.01)

(52) U.S. Cl.
CPC ...... *G06F 16/9562* (2019.01); *G06F 16/9566* (2019.01)

(58) Field of Classification Search
CPC .................. G06F 16/9562; G06F 16/9566
See application file for complete search history.

(56) References Cited

U.S. PATENT DOCUMENTS

| | | | | |
|---|---|---|---|---|
| 7,146,415 B1 * | 12/2006 | Doi | | G06F 16/9566 709/224 |
| 7,945,556 B1 | 5/2011 | Barnes et al. | | |
| 2001/0047404 A1 * | 11/2001 | Suda | | G06F 16/9562 709/223 |

(Continued)

FOREIGN PATENT DOCUMENTS

| | | |
|---|---|---|
| CN | 103605704 B | 2/2017 |
| WO | 2015/043308 A1 | 4/2015 |

(Continued)

OTHER PUBLICATIONS

API Design Guide, Use RESTful service URLs (Nov. 2, 2017) Available at https://apiguide.readthedocs.io/en/latest/build_and_publish/use_RESTful_urls.html (last accessed Dec. 1, 2020) (Year: 2017).*

(Continued)

*Primary Examiner* — Shahid K Khan
(74) *Attorney, Agent, or Firm* — Sheppard Mullin Richter & Hampton LLP

(57) ABSTRACT

Systems and methods are provided for URI (Uniform Resource Identifier) consolidation. An exemplary method for URI consolidation may comprise receiving a URI comprising one or more URI segments in a string from left to right, parsing the URI to determine if any of the URI segments matches with any of a plurality of URI segment records in a URI database, and in response to determining one or more URI segments matching respectively with one or more of the URI segment records, using a portion of the received URI up to and including a rightmost URI segment matching with a URI segment record in the URI database to represent the received URI.

18 Claims, 5 Drawing Sheets

Consolidated URI table

Show [10 ▼] entries          Search: [driverinfo]

| Host | Path | CA | Activity index | First | Most recent |
|---|---|---|---|---|---|
| api.web.com | /api/v2/p_getdriverinfo | 20 | 10.41 | 9.4.17 | 9.28.17 |
| wave.web.com | /v2/dc/stats/driverinfo/day1 | 20 | 10.42 | 9.4.17 | 9.18.17 |
| wave.web.com | /v2/dc/stats/complaint/driverinfo | 21 | 10.41 | 2.4.17 | 8.28.17 |
| .... | ..... | .. | ... | ... | ... |

CA: cumulative apperances

(56) References Cited

U.S. PATENT DOCUMENTS

| | | | | |
|---|---|---|---|---|
| 2002/0143932 A1* | 10/2002 | Quintero | ............... | G06F 16/951 709/224 |
| 2011/0040769 A1* | 2/2011 | Tseng | .................... | G06F 16/951 707/750 |
| 2011/0225181 A1* | 9/2011 | Kubicki | ............. | G06Q 30/0629 707/769 |
| 2014/0149574 A1* | 5/2014 | Findeisen | ............. | H04L 43/065 709/224 |
| 2016/0072749 A1* | 3/2016 | Lu | ........................... | H04L 51/12 709/206 |
| 2017/0041432 A1* | 2/2017 | Damick | .................. | H04L 67/28 |

FOREIGN PATENT DOCUMENTS

| WO | WO-2015043308 A1 * | 4/2015 | ......... G06F 16/9566 |
|---|---|---|---|
| WO | 2015/087835 A1 | 6/2015 | |

OTHER PUBLICATIONS

Zhu et al., ULTR-CTR: Fast Page Grouping using URL Truncation for Real-time Click Through Rate Estimation, 2017 IEEE International Conference on Information Reuse and Integration (Year: 2017).*

PCT International Search Report and the Written Opinion dated Feb. 13, 2019, issued in related International Application No. PCT/US2018/065694 (9 pages).

* cited by examiner

300

302: Obtaining a plurality of URIs for operations of an online platform

304: Extracting all URI segments of the plurality of URIs

306: According to one or more rules, obtaining at least a portion of the extracted URI segments as URI segment records to store in a URI database

308: Receiving a URI comprising one or more URI segments in a string from left to right

310: Parsing the URI to determine if any of the URI segments matches with any of the URI segment records in the URI database

312: In response to determining one or more URI segments matching respectively with one or more of the URI segment records, using a portion of the received URI up to and including a rightmost URI segment matching with a URI segment record in the URI database to represent the received URI

FIG. 3

Consolidated URI table

Show [10] entries         Search: [driverinfo]

| Host | Path | CA | Activity index | First | Most recent |
|---|---|---|---|---|---|
| api.web.com | /api/v2/p_getdriverinfo | 20 | 10.41 | 9.4.17 | 9.28.17 |
| wave.web.com | /v2/dc/stats/driverinfo/day1 | 20 | 10.42 | 9.4.17 | 9.18.17 |
| wave.web.com | /v2/dc/stats/complaint/driverinfo | 21 | 10.41 | 2.4.17 | 8.28.17 |
| .... | ..... | .. | ... | ... | ... |

CA: cumulative apperances

FIG. 4

US 11,086,957 B2

SYSTEM AND METHOD FOR UNIFORM RESOURCE IDENTIFIER (URI) CONSOLIDATION

RELATED APPLICATION

This application claims the benefit of priority to U.S. Provisional Application No. 62/610,371, filed on Dec. 26, 2017, and entitled "System and Method for Uniform Resource Identifier (URI) Consolidation, the content of which is hereby incorporated by reference in its entirety.

TECHNICAL FIELD

This disclosure generally relates to methods and devices for Uniform Resource Identifier (URI) consolidation.

BACKGROUND

Daily operations of large-scale online platforms commonly involve millions or more URIs. The sheer number poses significant challenges for effective control and monitoring of these URIs and online resources associated with the platform. Therefore, to improve URI management and streamline platform operation, the URIs need to be effectively consolidated.

SUMMARY

Various embodiments of the present disclosure can include systems, methods, and non-transitory computer readable media for URI consolidation. According to one aspect, an exemplary method for URI consolidation may comprise receiving a URI comprising one or more URI segments in a string from left to right, parsing the URI to determine if any of the URI segments matches with any of a plurality of URI segment records in a URI database, and in response to determining one or more URI segments matching respectively with one or more of the URI segment records, using a portion of the received URI up to and including a rightmost URI segment matching with a URI segment record in the URI database to represent the received URI.

In some embodiments, before receiving the URI comprising one or more URI segments in a string from left to right, the method may further comprise obtaining a plurality of URIs for operations of an online platform, extracting all URI segments of the plurality of URIs, and according to one or more rules, obtaining at least a portion of the extracted URI segments as the URI segment records to store in the URI database.

In some embodiments, the one or more rules may comprise in response to obtaining an extracted URI segment comprising at least one of (1) one or more words or (2) an acronym for a plurality of words, storing the extracted URI segment as the URI segment record. The one or more words may comprise at least one of: one or more English words, or one or more Chinese words in pinyin. The acronym of a plurality of words may comprise at least one of: an acronym for a plurality of English words, or an acronym for a plurality of Chinese words in pinyin.

In some embodiments, the one or more rules may comprise in response to obtaining an extracted URI segment for more than a threshold frequency within a day, storing the extracted URI segment as the URI segment record.

In some embodiments, the one or more rules may comprise in response to obtaining an extracted URI segment obtained for more than a threshold frequency within a preset number of days, storing the extracted URI segment as the URI segment record.

In some embodiments, the one or more rules may comprise excluding URI segments representing static resources from the URI segment records.

In some embodiments, the each URI segment may comprise one or more alphabets, digits, and/or symbols. Each two of the neighboring URI segments may be separated by a backslash ("/") in the URI string.

In some embodiments, the received URI may comprise one or more transient URI segments to the right of the rightmost URI segment matching with the URI segment record in the URI database; the transient URI segments may be dynamically and temporarily generated; and the transient URI segment may comprise at least one of: a random string of texts, a phone number, an identification number, or a MD5 encoding.

According to another aspect, a system for URI (Uniform Resource Identifier) consolidation may comprise a processor and a non-transitory computer-readable storage medium storing instructions that, when executed by the processor, cause the system to perform a method for URI consolidation. The method may comprise receiving a URI comprising one or more URI segments in a string from left to right, parsing the URI to determine if any of the URI segments matches with any of a plurality of URI segment records in a URI database, and in response to determining one or more URI segments matching respectively with one or more of the URI segment records, using a portion of the received URI up to and including a rightmost URI segment matching with a URI segment record in the URI database to represent the received URI.

According to another aspect, a non-transitory computer-readable storage medium may store instructions that, when executed by the processor, cause the processor to perform a method for URI (Uniform Resource Identifier) consolidation. The method may comprise receiving a URI comprising one or more URI segments in a string from left to right, parsing the URI to determine if any of the URI segments matches with any of a plurality of URI segment records in a URI database, and in response to determining one or more URI segments matching respectively with one or more of the URI segment records, using a portion of the received URI up to and including a rightmost URI segment matching with a URI segment record in the URI database to represent the received URI.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3 illustrates a flowchart of an exemplary method for URI consolidation, in accordance with various embodiments.

FIG. 4 illustrates an exemplary table of consolidated URIs, in accordance with various embodiments.

DETAILED DESCRIPTION

Figure 1:
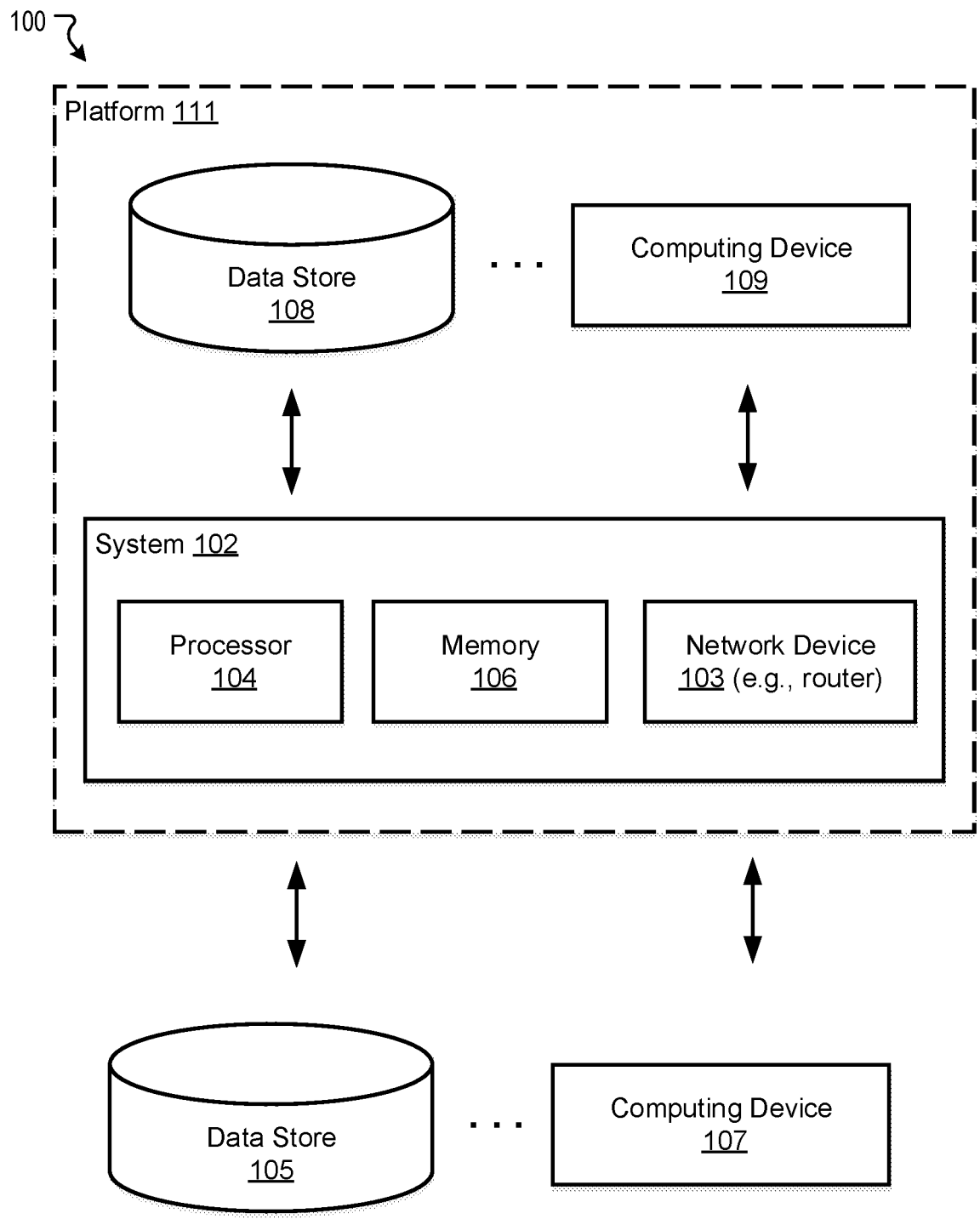
FIG. 1 illustrates an exemplary environment for URI consolidation, in accordance with various embodiments.

A URI is a string of characters for identifying a resource which can be, for example, a static file or a dynamic function (e.g., application programming interface (API)). A URI pointing to a source at a network location can also be referred to as a Uniform Resource Locator (URL). Such identification enables interaction with representations of the resource over the network, typically the World Wide Web, using specific protocols.

In some embodiments, a URI may comprise two parts: a string representing the host and a path to the resource. These two parts may be separated by the backslash "I" sign. The URI may optionally further comprise one or more other parts, such as scheme, user information, port, query, fragment, etc. The path and the query may be separated by a "?" sign, and the query and the fragment may be separated by a "#" sign. Each of the parts may have various representations. Three exemplary URIs/URLs are given below.

1.https://example.org/absolute/URI/with/absolute/path/to/resource.txt

This is a static resource URI. The scheme is "https", the host is "example.org", and the path is "/absolute/URI/with/absolute/path/to/resource.txt".

2.https://example.org/absolute/URI/with/absolute/path/to/function/show_my_na me?name=David This is an API function URI. The scheme is "https", the host is "example.org", the path is "/absolute/URI/with/absolute/path/to/function/show_my_name", and the query is "name=David".

3.abc://username:password@example.com:123/path/data?key=value&key2=val ue2#fragid1

This is also an API function URI. The scheme is "abc", the user information is "username:password", the host is "example.com", the port is "123", the path is "/path/data", the query is "key=value&key2=value2", and the fragment is "fragid1". The user information, the host, and the port may be referred to as authority, and the authority and the path may be referred to as the hierarchical part.

URIs can specify locations of various network resources or information and are critical to the operation of online platforms. Normally, an online platform may need to create or manage millions or more URIs in its operation. For the static resource URIs described above, there can be tens of thousands of them in a similar path, with only differences in the resource names (e.g., resouce.txt) at the path ends. For the API URIs described above, even more URIs are generated because the each path may contain transient information temporarily generated for incumbent usage, such as unique numbers, random sequences, token, cryptographic coding, etc. Therefore, with the constant generation of new URIs, current technologies lack effective measures to keep track of them.

The disclosed systems and methods for URI consolidation at least reduce the tremendous difficulty for consistently monitoring and managing the URIs. In various embodiments, a disclosed system may obtain a plurality of URIs for operations of an online platform, extract all URI segments of the plurality of URIs, and according to one or more rules, obtain at least a portion of the extracted URI segments as URI segment records to store in a URI database. Further, to apply the URI database in URI consolidation, the system may receive a URI comprising one or more URI segments in a string from left to right, parse the URI to determine if any of the URI segments matches with any of a plurality of URI segment records in a URI database, and in response to determining one or more URI segments matching respectively with one or more of the URI segment records, use a portion of the received URI up to and including a rightmost URI segment matching with a URI segment record in the URI database to represent the received URI. Thus, the countless URIs can be consolidated to a significantly smaller and manageable size according to their main functionalities or paths.

In some embodiments, the one or more rules may comprise in response to obtaining an extracted URI segment comprising at least one of (1) one or more words or (2) an acronym for a plurality of words, storing the extracted URI segment as the URI segment record. The one or more words may comprise at least one of: one or more English words, or one or more Chinese words in pinyin. The acronym of a plurality of words may comprise at least one of: an acronym for a plurality of English words, or an acronym for a plurality of Chinese words in pinyin. In some embodiments, the one or more rules may comprise in response to obtaining an extracted URI segment for more than a threshold frequency within a day, storing the extracted URI segment as the URI segment record. In some embodiments, the one or more rules may comprise in response to obtaining an extracted URI segment obtained for more than a threshold frequency within a preset number of days, storing the extracted URI segment as the URI segment record. In some embodiments, the one or more rules may comprise excluding URI segments representing static resources from the URI segment records.

As such, the disclosed technical solutions use specific and unconventional rules for consolidating URIs, that is, rules for detecting and trimming dynamic and transient portions of the URIs. The computer system can automatically parse received URIs, automatically identify redundant URI portions, and automatically discard the redundant parts to obtain consolidated URIs. Collectively, this allows the computer system to significantly reduce the number of URIs to monitor, and thus improves computer functionalities, saves storage resources, and improves efficiency for managing system resources. In one example, for a large-scale computer platform of which the size of URIs is exceedingly large, the URI consolidation can offer a clearer and more intuitive pathway for tracking the access of system resources over the network, and allow quicker detection of any abnormal usage.

FIG. 1 illustrates an exemplary environment 100 for URI consolidation, in accordance with various embodiments. As shown in FIG. 1, the exemplary system 100 can comprise at least one computing system 102 that includes one or more processors 104, memory 106, and network device 103. The memory 106 may be non-transitory and computer-readable.

The memory 106 may store instructions that, when executed by the one or more processors 104, cause the one or more processors 104 to perform various operations described herein. The network device may be implemented in various forms, such as a router or another device that directs Internet traffic. The system 102 may be implemented on or as various devices such as mobile phone, tablet, server, computer, wearable device (smart watch), etc. The system 102 may be installed with appropriate software (e.g., data transfer program, etc.) and/or hardware (e.g., wire connections, wireless connections, etc.) to access other devices of the system 100.

The system 100 may include one or more data stores (e.g., a data store 105 or 108) and one or more computing devices (e.g., a computing device 107 or 109) that are accessible to the system 102. In some embodiments, the system 102 may be configured to obtain data from the data store (e.g., a cloud database) and/or the computing device (e.g., a server, a mobile phone, a vehicle computer, a tablet, a wearable device (smart watch)).

In some embodiments, the data store 108, the computing device 109, and the system 102 may couple to each other and implement an online platform 111 (e.g., a vehicle platform for hailing vehicles via the Internet) as indicated by dash lines in this figure. Thus, systems and devices within the platform 111 may be "internal" to the system 102, and systems and devices outside the platform 111 may be "external" to the system 102. In some implementations, the platform 111 may utilize, provide, or otherwise touch upon various online resources (e.g., stored files, information, etc.). The online resources may be stored at any location in the environment (e.g., the data store 108, the data store 105, the computing device 109, the computing device 107, the memory 106, etc.). In some embodiments, the network device 103 may record URIs for the various resources. For example, when a user uses the computing device 107 (e.g., a mobile phone) to place a complaint about a particular driver, whose information is stored in a "driverinfo" table in the data store 108, a URI pointing to the "driverinfo" table may be recorded by the network device 103 when the complaint is stored. The recorded URI and other URIs may be consolidated by the system 102.

In some embodiments, the system 102 and the one or more computing devices (e.g., the computing device 109) may be integrated in a single device or system. Alternatively, the system 102 and the one or more computing devices may operate as separate devices. The one or more data store (e.g., the data store 108) may be anywhere accessible to the system 102, for example, in the memory 106, in the computing device 109, in another device (e.g., network storage device) coupled to the system 102, or another storage location (e.g., cloud-based storage system, network file system, etc.), etc. The system 102 may be implemented as a single system or multiple systems coupled to each other. In general, the system 102, the computing device 109, the data store 108, the computing device 107, and the data store 105 may be able to communicate with one another through one or more wired or wireless networks (e.g., the Internet) through which data can be communicated.

Figure 2:
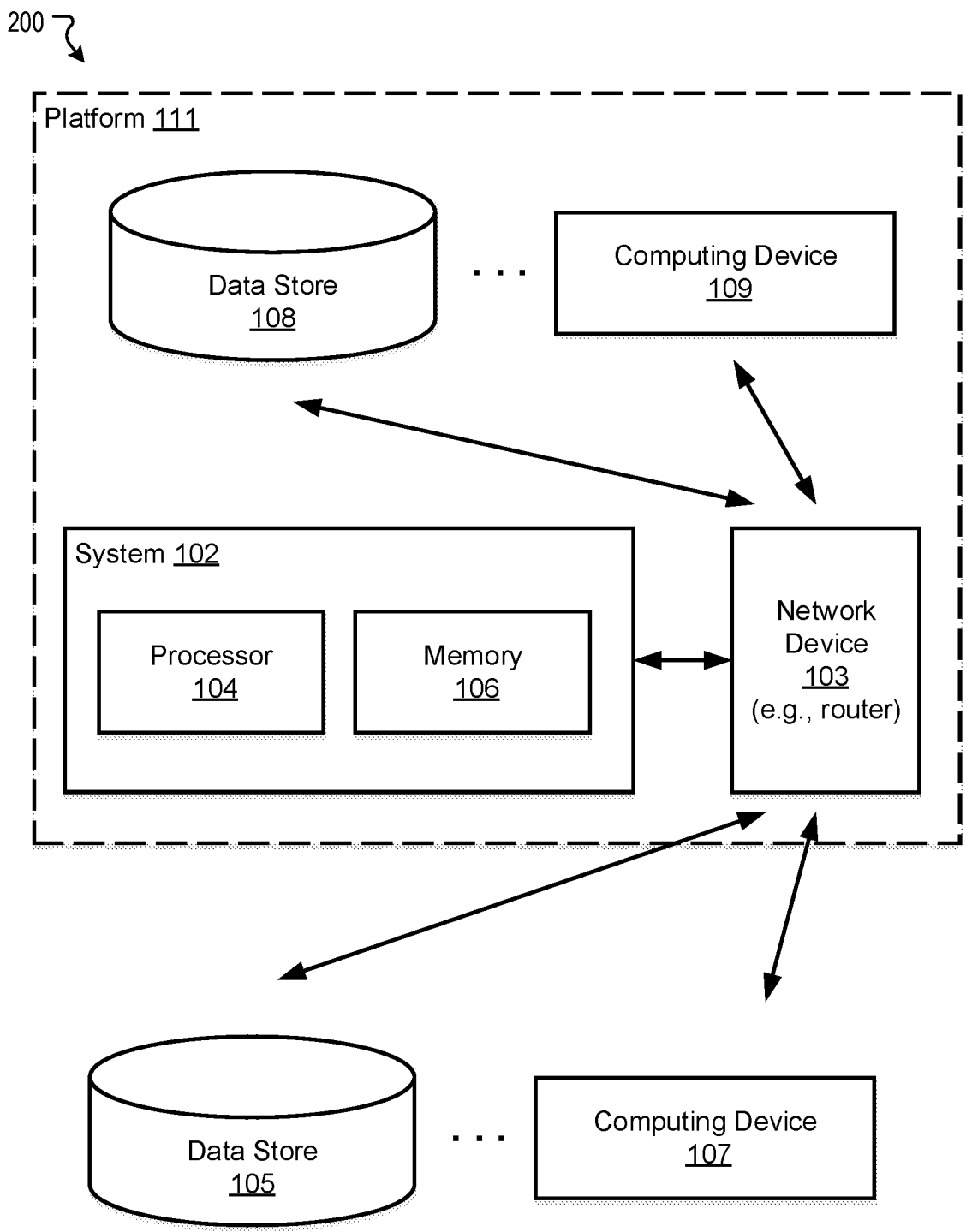
FIG. 2 illustrates another exemplary environment for URI consolidation, in accordance with various embodiments.

FIG. 2 illustrates another exemplary environment 200 for URI consolidation, in accordance with various embodiments. The operations shown in FIG. 2 and presented below are intended to be illustrative. The various systems and devices and their functions in FIG. 2 are similar to those described above with reference to FIG. 1, except that the network device 103 is disposed outside the system 102. The network device 103 may be disposed anywhere in the environment 200 in addition to that illustrated in this figure.

For example, the network device 103 may be incorporated into the computing device 109 or the computing device 107. As described above, various systems and devices may access or provide resources across the network, and the network device 103 may record the URIs corresponding to the resources. The system 102 may couple to the network device 103 and obtain and consolidate the URIs.

FIG. 3 illustrates a flowchart of an exemplary method 300 for URI consolidation, according to various embodiments of the present disclosure. The method 300 may be implemented in various environments including, for example, the environment 100 of FIG. 1 or the environment 200 of FIG. 2. The exemplary method 300 may be implemented by one or more components of the system 102 (e.g., the processor 104, the memory 106). The system 102 may be implemented on a server, a computer, a router, etc. The exemplary method 300 may be implemented by multiple systems similar to the system 102 (e.g., a computer). The operations of method 300 presented below are intended to be illustrative. Depending on the implementation, the exemplary method 300 may include additional, fewer, or alternative steps performed in various orders or in parallel.

In some embodiments, blocks 302-306 may represent steps for obtaining a URI database, and blocks 308-312 may represent steps for consolidating URIs. Blocks 302-306 may be optional. At block 302, optionally, a plurality of URIs for operations of an online platform may be obtained. For example, all URIs appeared in platform operations for a number of days may be collected. At block 304, optionally, all URI segments of the plurality of URIs may be extracted. At block 306, optionally, according to one or more rules, at least a portion of the extracted URI segments may be obtained as URI segment records to store in a URI database. At block 308, a URI comprising one or more URI segments in a string from left to right may be received (e.g., from the network device 103 or another device accessing the platform 111). At block 310, the URI may be parsed to determine if any of the URI segments matches with any of a plurality of URI segment records in a URI database. At block 312, in response to determining one or more URI segments matching respectively with one or more of the URI segment records, a portion of the received URI up to and including a rightmost URI segment matching with a URI segment record in the URI database may be used to represent the received URI. That is, the rest of the received URI (to the right of the rightmost URI segment matching with a URI segment record in the URI database) may be discarded. If no matching with any URI segment record is found, the host in the URI may be used to represent the received URI.

As described above, a URI may comprise a path that includes various URI segments. The each URI segment may comprise one or more alphabets, digits, and/or symbols (e.g., #, @). Further, each two of the neighboring URI segments may be separated by a backslash ("/") in the URI string. In one example, for a URI https://example.org/absolute8/URI/123/ . . . , "absolute8", "URI", and "123" are URI segments in a string from left to right following the host "example.org" and separated by backslashes "/".

In some embodiments, the received URI may comprise one or more transient URI segments to the right of the rightmost URI segment matching with the URI segment record in the URI database. The transient URI segments may be dynamically and temporarily generated for purposes such as information protection. The transient URI segments can be detected and trimmed according to the disclosed methods. The transient URI segment may comprise at least one of: a random string of texts, a phone number, an identification number, or a MD5 encoding. Here, the texts may comprise letters (or an alternative representation for various languages), digits, and/or symbols.

For example, two URIs are listed below.

(1) aapi-sec-epp.xiaojukeji.com/aapi/v1/cdbFile/proxy-vt/04fe2c17c2e9df01859 18bfd144aa4f7a5111db0589fb615af46bd2c2beef01c (2) aapi-sec-epp.xiaojukeji.com/aapi/v1/cdbFile/proxy-vt/05bf66bf7cfba48d7730 c4d962ea65c9f089cc374ca9a9325212807c7c207c3e In these two URIs, each comprises an MD5 encoding in a string of randomly generated digits and letters at the rightmost URI segment position. Thus, these two URIs can be can be consolidated to one: aapi-sec-epp.xiaojukeji.com/aapi/v1/cdbFile/proxy-vt.

The one or more rules in step 306 may comprise a combination of rules, some of which are provided below, to determine the URI segment records. That is, the rules can help determine meaningful URI segments from random URI segments. Each of the rules described below may be assigned a weight in the determination.

In some embodiments, the one or more rules in step 306 may comprise, in response to obtaining an extracted URI segment comprising at least one of (1) one or more words or (2) an acronym for a plurality of words, storing the extracted URI segment as the URI segment record. The one or more words may comprise at least one of: one or more English words (e.g., get, detail2, pGetDetail), or one or more Chinese words in pinyin (e.g., weixin, dache). The acronym of a plurality of words comprise at least one of: an acronym for a plurality of English words (e.g., CNN), or an acronym for a plurality of Chinese words in pinyin (e.g., DDCX-v5). Various other languages and representations can alternatively or additionally be used. The system 102 may determine the URI segment's composition, for example, if the URI segment comprises purely alphabets, or a mixture of digits, alphabets, and symbols. For each composition category, the system 102 may maintain a database of recognized words (e.g., dictionary words, location names, trade names, common phrases), acronyms thereof, or manually generated strings (letters, digits, and/or symbols) to perform the determination.

In some embodiments, the one or more rules in step 306 may comprise in response to obtaining an extracted URI segment for more than a threshold frequency within a day, storing the extracted URI segment as the URI segment record. For example, a random string like "9f089cc374ca9a932521" may be transient and appear at most 2 or 3 times among all URIs, whereas a string "v2-1" may repeatedly appear for hundreds of times a day in various URIs and should be included as the URI segment record.

In some embodiments, the one or more rules in step 306 may comprise in response to obtaining an extracted URI segment obtained for more than a threshold frequency within a preset number of days, storing the extracted URI segment as the URI segment record. For example, if the platform implements a promotion activity called "buy1get5", some key strings related to the promotion such as "b1g5" may appear repeatedly in the daily URI traffic and should be included as the URI segment record.

In some embodiments, the one or more rules may comprise excluding URI segments representing static resources from the URI segment records. For example, segments ending with ".txt" (text files), ".png" (graphs), ".xls" (Excels), and ".pdf" (PDF files) may represent various documents and should be excluded. The system 102 may maintain a list of formats identified as static resources. For example, in https://example.org/absolute/URI/with/absolute/path/resource.txt, "absolute", "URI", "with", "absolute", and "path" may be used as the URI segment records, but not "resource.txt".

The method 300 may be applied to a plurality of received URIs, such as URIs in the daily URI traffic of the platform 111, to obtain consolidated URIs. Referring to FIG. 4, FIG. 4 illustrates an exemplary table of consolidated URIs, in accordance with various embodiments. The operations shown in FIG. 4 and presented below are intended to be illustrative. As shown in this figure, a keyword "driverinfo" is searched, and matching URIs are shown in the table. Each URI is separated into a host and a path, and is associated with a cumulative appearance, an activity index, a first day of appearance, and a most recent day of appearance. As expected in this table, no path ends with a transient URI segment, which has been trimmed according to the disclosed methods.

As such, a daily number of millions or more unique URIs can be consolidated to thousands or less, dramatically reducing the burden of URI monitoring. Further, the consolidated URIs can be maintained in a light-weight database for internal reference and usage. Together with other information such as the first appearance date, the most recent appearance date, the cumulative appearances, and the activity index, the consolidated URIs can be easily retrieved and orderly organized.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
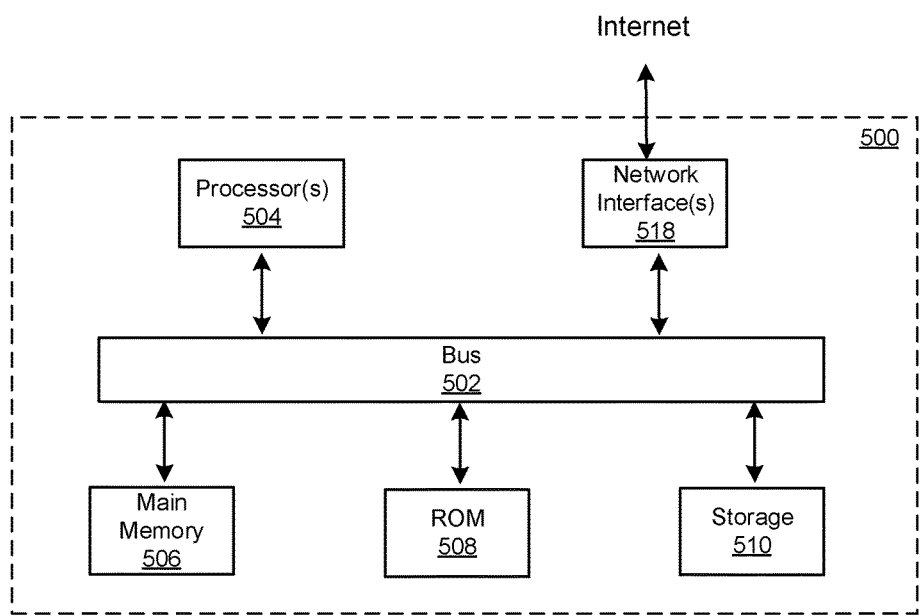
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information. The network interface 518 may correspond to the network device 103 described above with reference to FIG. 1.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

[71] As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

[72] Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for URI (Uniform Resource Identifier) consolidation, comprising:
   obtaining a plurality of URIs for operations of an online platform;
   extracting a plurality of URI segments of the plurality of URIs;
   in response to determining that one or more URI segments of the plurality of URI segments have been received at a frequency higher than a threshold within a preset time period, storing the one or more URI segments as one or more URI segment records in a URI database;
   receiving a first URI comprising one or more URI segments in a string from left to right;
   parsing the first URI to determine the one or more URI segments of the first URI match respectively with one or more of URI segment records in the URI database; and
   in response to determining that the one or more URI segments of the first URI match respectively with the one or more of the URI segment records,
      selecting a portion of the first URI up to and including a rightmost URI segment matching with one of the URI segment records in the URI database to represent the first URI, and
      discarding all segments of the first URI that are to the right of the selected portion.

2. The method of claim 1, further comprising:
   in response to obtaining an extracted URI segment comprising at least one of (1) one or more words or (2) an acronym for a plurality of words, storing the extracted URI segment as a URI segment record.

3. The method of claim 2, wherein:
   the one or more words comprise at least one of: one or more English words, or one or more Chinese words in pinyin; and
   the acronym of the plurality of words comprise at least one of: an acronym for a plurality of English words, or an acronym for a plurality of Chinese words in pinyin.

4. The method of claim 1, further comprising:
   excluding URI segments representing static resources from the URI segment records.

5. The method of claim 1, wherein:
   each of the plurality of URI segments comprises one or more alphabets, digits, and/or symbols; and
   each two neighboring URI segments of the plurality of URI segments are separated by a slash ("/").

6. The method of claim 1, wherein:
   the first URI comprises one or more transient URI segments to the right of the rightmost URI segment matching with the URI segment record in the URI database;
   the transient URI segments are dynamically and temporarily generated; and
   the transient URI segments each comprise at least one of: a random string of characters, a phone number, an identification number, or an MD5 encoding.

7. A system for URI (Uniform Resource Identifier) consolidation, comprising a processor and a non-transitory computer-readable storage medium storing instructions that, when executed by the processor, cause the system to perform operations comprising:

obtaining a plurality of URIs for operations of an online platform;

extracting a plurality of URI segments of the plurality of URIs;

in response to determining that one or more URI segments of the plurality of URI segments have been received at a frequency higher than a threshold within a preset time period, storing the one or more URI segments as one or more URI segment records in a URI database;

receiving a first URI comprising one or more URI segments in a string from left to right;

parsing the first URI to determine the one or more URI segments of the first URI match respectively with one or more of URI segment records in the URI database; and in response to determining that the one or more URI segments of the first URI match respectively with the one or more of the URI segment records,
selecting a portion of the first URI up to and including a rightmost URI segment matching with one of the URI segment records in the URI database to represent the first URI, and
discarding all segments of the first URI that are to the right of the selected portion.

8. The system of claim 7, wherein the operations further comprise:

in response to obtaining an extracted URI segment comprising at least one of (1) one or more words or (2) an acronym for a plurality of words, storing the extracted URI segment as a URI segment record.

9. The system of claim 8, wherein:

the one or more words comprise at least one of: one or more English words, or one or more Chinese words in pinyin; and the acronym of the plurality of words comprise at least one of: an acronym for a plurality of English words, or an acronym for a plurality of Chinese words in pinyin.

10. The system of claim 7, wherein the operations further comprise excluding URI segments representing static resources from the URI segment records.

11. The system of claim 7, wherein:

each of the plurality of URI segments comprises one or more alphabets, digits, and/or symbols; and each two neighboring URI segments of the plurality of URI segments are separated by a slash ("/").

12. The system of claim 7, wherein:

the first URI comprises one or more transient URI segments to the right of the rightmost URI segment matching with the URI segment record in the URI database;

the transient URI segments are dynamically and temporarily generated; and the transient URI segments each comprise at least one of: a random string of characters, a phone number, an identification number, or an MD5 encoding.

13. A non-transitory computer-readable storage medium storing instructions that, when executed by a processor, cause the processor to perform operations comprising:

obtaining a plurality of URIs for operations of an online platform;

extracting a plurality of URI segments of the plurality of URIs;

in response to determining that one or more URI segments of the plurality of URI segments have been received at a frequency higher than a threshold within a preset time period, storing the one or more URI segments as one or more URI segment records in a URI database;

receiving a first URI comprising one or more URI segments in a string from left to right;

parsing the first URI to determine the one or more URI segments of the first URI match respectively with one or more of URI segment records in the URI database; and in response to determining that the one or more URI segments of the first URI match respectively with the one or more of the URI segment records,
selecting a portion of the first URI up to and including a rightmost URI segment matching with one of the URI segment records in the URI database to represent the first URI, and
discarding all segments of the first URI that are to the right of the selected portion.

14. The non-transitory computer-readable storage medium of claim 13, wherein the operations further comprise:

in response to obtaining an extracted URI segment comprising at least one of (1) one or more words or (2) an acronym for a plurality of words, storing the extracted URI segment as a URI segment record.

15. The non-transitory computer-readable storage medium of claim 14, wherein:

the one or more words comprise at least one of: one or more English words, or one or more Chinese words in pinyin; and the acronym of the plurality of words comprise at least one of: an acronym for a plurality of English words, or an acronym for a plurality of Chinese words in pinyin.

16. The non-transitory computer-readable storage medium of claim 13, wherein the operations further comprise excluding URI segments representing static resources from the URI segment records.

17. The non-transitory computer-readable storage medium of claim 13, wherein:

each of the plurality of URI segments comprises one or more alphabets, digits, and/or symbols; and each two neighboring URI segments of the plurality of URI segments are separated by a slash ("/").

18. The non-transitory computer-readable storage medium of claim 13, wherein:

the first URI comprises one or more transient URI segments to the right of the rightmost URI segment matching with the URI segment record in the URI database;

the transient URI segments are dynamically and temporarily generated; and the transient URI segments each comprise at least one of: a random string of characters, a phone number, an identification number, or a MD5 encoding.

* * * * *